Feb. 20, 1968     L. N. BOOSEY ET AL     3,369,826

CRYOGENIC FLUID TRANSFER CONDUIT

Filed Aug. 22, 1961     2 Sheets-Sheet 1

INVENTORS
LAWRENCE N. BOOSEY
RALPH A. TRENTHAM
JOHN H. BECKMAN

BY William F. Mesinger
ATTORNEY

1

3,369,826
CRYOGENIC FLUID TRANSFER CONDUIT
Lawrence N. Boosey, Ralph A. Trentham, and John H. Beckman, Indianapolis, Ind., assignors to Union Carbide Corporation, a corporation of New York
Filed Aug. 22, 1961, Ser. No. 133,073
2 Claims. (Cl. 285—47)

This invention relates to apparatus for handling fluids and particularly to thermally insulated transfer conduit for transporting such fluids.

Employment of insulated fluid transfer conduits in industries such as the aircraft and missile industries has increased in the past few years. With the development of cryoelectronics, the uses of such cryogenic fluids as liquid nitrogen, hydrogen, neon, argon and helium as refrigerants in missile technology have increased many fold, as have also the uses of liquid oxygen and liquid hydrogen as missile propellants. These cryogenic fluids are often consumed in such large quantities and alloted such restricted space for storage, that the development of transfer techniques which will minimize losses due to unavoidable heat leak has become imperative.

It is not unusual to find applications having critical space limitations, such as those found in the missile industry, where fluids must be transported through surroundings that are either warmer or colder than the atmospheric boiling and freezing temperatures of the fluid. Thus, the fluid transfer apparatus employed must be resistive to heat leak both from warmer and from colder mediums. In addition, the transfer apparatus is often called upon to resist severe vibration and shock forces, and may also have to traverse a tortuous path around other elements of a complex system of which the transfer apparatus is a part. Cryogenic fluid transfer conduits are also being employed in "ground" installations to transport large bodies of such fluids from one area to another. In such applications, the forces of atmospheric pressure create considerable design problems.

Prior art transfer apparatus has unsuccessfully attempted to resolve these problems. To protect against shock and vibration forces, as well as forces exerted by atmospheric pressure, the prior art provided relatively thick-walled, double-shelled and vacuum-insulated, transfer conduits which were not only heavy and therefore difficult to fit to the tortuous path required, but also increased the amount of heat leak inasmuch as the relatively large cross-sectional area provided by the increased thickness enlarged the available heat leak path.

These thick-walled shells also magnified the problems involved in coping with the thermal expansion and contraction within the transfer conduit. If the fluid transported is surrounded by a warmer medium, the outer shell tends to expand while the inner conduit contracts, and if the surrounding medium is colder, the opposite occurs. This creates the difficulty of maintaining a vacuum-tight seal between the inner conduit and the outer shell which is sufficiently flexible to withstand the relative contractions and expansions of the walls to be joined thereby. The prior art proposes to solve this expansion problem by utilizing a thin-walled bellows section to connect sections of the inner conduit. However, these bellows are extremely sensitive to vibration and therefore their employment defeats the purpose of utilizing thick-walled conduits in the first place. Furthermore, in "ground" installations the bellows are often unable to completely compensate for the expansions and contractions of the transfer conduit because of the magnitudes thereof.

The problems just stated are particularly apparent where more than one section of the transfer conduit is required. That is, where such sections are joined to provide the requisite total length of the transfer conduit.

It is an object of this invention to provide a light weight double-walled, vacuum insulated fluid transfer conduit having a thin-walled outer shell which permits thermal expansion and contractions of the transfer conduit without loss of the effectiveness of the insulating characteristics thereof. Another object is to provide a fluid transfer conduit which may be constructed in sections such that upon joinder of these sections to provide a total requisite transfer conduit length, the overall insulating qualities of the transfer conduit are not appreciably diminished. It is a further object of this invention to provide means for coupling these individual sections such that the overall insulating qualities of the transfer conduit are not appreciably diminished.

These and other objects of the present invention will become apparent from the following description and the accompanying drawings, in which.

Figure 1:
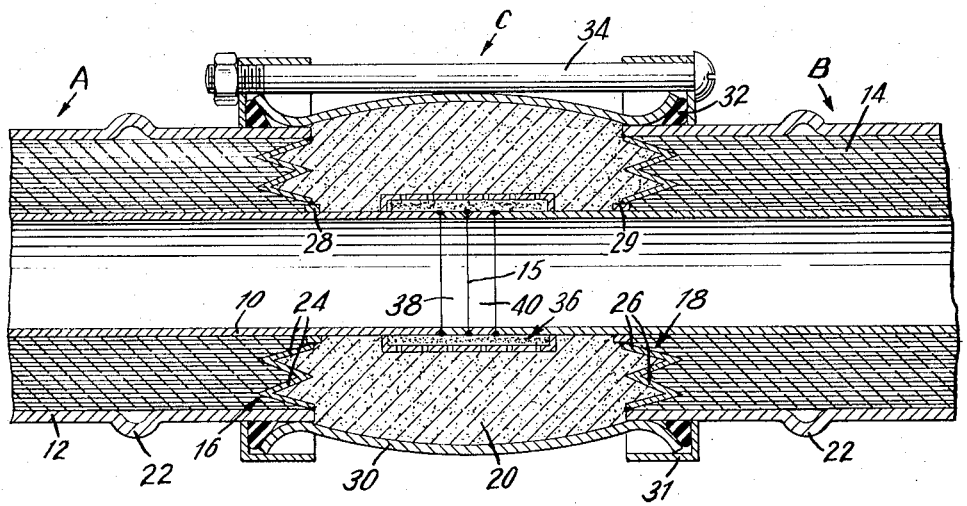
FIG. 1 is a view in cross section of an exemplary conduit joint according to the invention.

In accordance with the present invention, a vacuum-insulated, double-walled transfer conduit is provided for transporting fluids. This transfer conduit permits the transportation of cryogenic liquids through warmer or colder surrounding mediums with substantially no loss of liquid because of vaporization caused by the absorption of heat leak from warmer surroundings, or increase in viscosity caused by the effect of colder surroundings. Opacified insulating means are provided which substantially fill an evacuable insulation space which is formed by the inner fluid conduit and the concentrically enclosing outer shell or jacket. Such insulating means markedly restrict the passage of heat either into or out of the transfer conduit.

The term "opacified insulation" as used herein refers to a two-component insulating system comprising a low heat conductive, radiation permeable material and a radiant heat impervious material which is capable of reducing the passage of infrared rays without significantly increasing the thermal conductivity of the insulating system.

In order to permit the transfer conduit to contract and expand, and to impart greater stiffness to the transfer line such that the thickness of the wall of the outer jacket may be reduced thereby decreasing the heat leak by solid conduction within the outer jacket, it has been found desirable to disrupt the continuity of the inner and outer surfaces of the outer jacket by forming a plurality of spaced, annular, anticlinal-like protrusions or rings. The result is a transfer conduit that is stiffer laterally than typical prior art transfer conduits which employ corrugated outer jackets and yet is equally as flexible in the longitudinal direction. This feature materially alleviates the problem of lateral sagging which is characteristic of such prior art transfer conduits. The evacuable insulation space formed by the inner conduit and the concentrically enclosing outer jacket is sealed at the ends by obliquely joining the outer jacket to the inner conduit. Such oblique joining means markedly increases the resistance to heat leakage by solid conduction through the outer jacket into or out of the inner conduit. It is preferred that the evacuable insulation space be evacuated to an absolute pressure below about 30 microns of mercury, although any absolute pressure below about 100 microns of mercury is suitable for aiding in the insulating of cryogenic fluids from the effects of the surrounding medium.

Where two or more sections of the transfer conduit are joined, the invention contemplates the employment of an improved coupling means therefor. Such coupling means vacuum-tightly joins the outer jacket sections when the inner conduit sections are leak-tightly connected. The insulation space formed by such coupling is preferably substantially filled with opacified insulating material thereby maintaining the overall excellent insulation characteristics of the entire transfer conduit. The space also contains a molecular sieve adsorbent which not only helps to maintain the vacuum in the space, but is also used to create the vacuum.

The preferred embodiment of the transfer conduit depicted in FIG. 1 comprises an inner fluid conduit 10 and an outer jacket 12 which concentrically encloses inner conduit 10 thereby forming an evacuable insulation space 14. This embodiment shows the end portions of two similar transfer conduit sections, A and B, which are connected by coupling means C. The A and B sections of inner conduit 10 are integrally joined longitudinally at 15 by means such as welding. The A and B sections of evacuable insulation spaces 14 are respectively sealed at their joint ends by joining means 16 and 18, which join the respective sections of outer jacket 12 to inner conduit 10, such vacuum tight joining means being constructed to provide an elongated path for heat conduction. A coupling means C vacuum-tightly connects the respective sections of outer jackets 12, thereby enclosing evacuable space 20 around the joint and joining means 16 and 18. It is to be understood that should it be desired to provide the transfer conduit with no joint, coupling means C would be unnecessary, however, in most applications, more than one section of the transfer conduit will be required inasmuch as fabricating and shipping problems are simplified by employing sections less than about 40 feet in length.

Evacuable insulation spaces 14 are preferably substantially filled with opacified insulation taking the form of a low heat conductive material and a multiplicity of spaced radiation impervious barriers. As more fully described and claimed in copending U.S. application Ser. No. 597,947, filed July 16, 1956, in the name of L. C. Matsch, the low heat conductive material may be fiber insulation which may be produced in sheet form. Examples include a filamentary glass material such as glass wool and fiber glass, preferably having fiber diameters less than about 50 microns. Also such fibrous materials preferably have a fiber orientation substantially perpendicular to the direction of heat flow across the insulation space. The spaced radiation-impervious barriers may comprise either a metal, metal oxide, or metal coated material, such as aluminum coated plastic film, or other radiation reflective or radiation adsorptive material or a suitable combination thereof. Radiation reflective material comprising thin metal foils are particularly suited in the practice of the present invention, for example, reflective sheets of aluminum foil having a thickness between 0.2 mm. and 0.002 mm. When fiber sheets are used as the low-conductive material, they may additionally serve as a support means for relatively fragile impervious sheets. For example, it is preferred than an aluminum foil-fiber sheet insulation be spirally wrapped around inner conduit 10 with one end of the insulation wrapping in contact with inner conduit 10, and the other end nearest outer jacket 12, or in actual contact therewith.

It will be appreciated that other forms of opacified insulation may be used. For example, the radiation impervious barriers may be incorporated directly into the low heat conductive material as described and claimed in U.S. Patent No. 2,967,152, issued in the name of L. C. Matsch et al. Such opacified powder-vacuum type insulation might comprise, for example, equal parts by weight of copper flakes and finely divided silica. The latter material has a very low solid conductivity value but is quite transparent to radiation. The copper flakes serve to markedly reduce the radiant heat inleak.

Even though the previously described preferred opacified insulation is more effective than straight vacuum insulation at high internal pressure (poorer vacuum), its effective thermal insulation life is extended if the pressure can be maintained at or below a desired level such as, for example, below about 30 microns of mercury absolute. A gas removing material such as an adsorbent may be used in evacuable insulation space 14 to remove by adsorption any gas entering through the joints of the transfer conduit. In particular, crystalline zeolitic molecular sieves having pores of at least about 5 Angstrom units in size, as disclosed in U.S. Patent No. 2,900,800 issued in the name of P. E. Loveday, may be employed as the adsorbent in accordance with the teaching therein since they have extremely high adsorptive capacity at the temperature and pressure conditions existing in evacuable insulation space 14 and are chemically inert toward any gases which might leak into such insulating space. The adsorbent material may be provided within evacuable insulation space 14, for example, by a blister (not shown) which may be wrapped around inner conduit 10 or may be intermixed with the insulation material. If a blister is provided, a wire screen (not shown) may be employed to provide gas communication between evacuable insulation space 14 and the adsorbent material within the blister. The adsorbent is preferably in thermal conductive relation to the coldest wall; adjacent the inner conduits 10 where the cold fluid is passed therein or adjacent the outer casing when the conduit is to carry a warmer fluid through a body of very cold material.

Outer jacket 12 has a plurality of spaced annular anticlinal-like protrusions or rings 22 which provide for longitudinal flexibility. The spacing of annular rings 22 depends upon the application. For example, in many missile applications, it has been found desirable to employ transfer conduits with an outer jacket having 1 to 16 annular rings per foot of length, each annular ring having a height of about 5/16 inch. Of course, the precise number and the size of such annular rings is determined by the amount of flexibility and strength desired.

It is preferred that outer jacket 12 be constructed of stainless steel because of its high strength, high corrosion resistance and lower thermal conductivity characteristics. For small diameter transfer conduits of about ½ inch outer diameter, it has been found that the wall thickness of outer jacket 12 should be at least 0.005 inch to withstand the pressure differential created by evacuating insulation space 14. Where various applications call for a transfer conduit with an outer diameter from about 4 to 12 inches, it has been found the wall thickness of outer jacket 12 may vary up to about 0.080 inch. It appears that, for any application of the transfer conduit wherein evacuable insulation space 14 is maintained at a positive pressure below about 100 microns of mercury absolute, and preferably below about 30 microns of mercury, the wall thickness of outer jacket 12 should be at least about 0.005 inch but need not be larger than about 0.080 inch.

This combination of a relatively thin-walled outer jacket with spaced annular rings, providing for longitudinal flexibility makes possible the construction of a remarkably versatile transfer conduit. For example, typical prior art transfer conduits having an outer diameter of 5 inches and an inner diameter of 3½ inches weighs approximately 17.5 lbs. per foot of length. The equivalent transfer conduit of the present invention weighs approximately 3.0 lbs. per foot of length. This is a decided improvement where weight limitations are critical, such as in the aircraft and missile industries.

The joining means 16 and 18 preferably is formed of one or more of thin walled annular re-entrant members forming an elongated heat path between the tube 10 and jacket 12 to which the inner and outer ends are gas tightly sealed. Such joining means may be frusto-conical and preferably comprise intersecting oppositely oriented, frusto-conical annular surfaces. For briefness, these joining means will hereinafter be called zigzag joining means. Zigzag joining means 16 and 18 may be formed from a single sheet of metal or, as is preferably from the standpoint of being able to provide more zigzag sections having greater re-entrant depths, they may be formed from separate frusto-conical annular rings 24 and 26. Such rings can be joined together in "head to toe" or base to apex end fashion by fusion welding, for example. These zigzag joining means are preferably constructed from stainless steel and are made as thin as possible; generally on the same order of thickness as the outer jacket. For ease in fabrication, it is preferred that joining means 16 and 18 be welded to inner conduit 10 through an intermediate member such as channel-shaped rings 28 and 29.

The zigzag configuration serves to markedly reduce the heat leakage through these joining means by substantially increasing the heat leak path between the outer surface of inner conduit 10 and the inner surface of outer jacket 12. For example, if the width of annular rings 24 and 26 is 2½ inches, and 6 such rings are employed within a ¾ inch space between the outer surface of inner conduit 10 and the inner surface of outer conduit 12, the effective heat path is expanded to approximately 15 inches. As shown in FIG. 1, although joining means 16 and 18 increase the heat leak path to inner conduit 10, they prevent the extension of the opacified insulating material in evacuable insulation space 14 to the end of the inner conduit joint ends at 15. This, however, has been compensated, to a great extent, by the zigzag configuration which, in addition to increasing the heat leak path, also serves as a radiation barrier due to the width of the annular rings 24 and 26. The width of such zigzag sections of joining means 16 and 18 is sufficiently large to impede the travel of infrared radiation waves and consequently the joining means configuration is an effective radiation barrier. FIG. 1 shows 2 of such radiation barriers.

The employment of thin zigzag joining means has been made feasible by employing thin-walled outer jacket 12 having spaced annular rings 22. When cryogenic fluid contacts inner conduit 10, such contact causes inner conduit 10 to contract a substantial amount. The present combination, including the thin-walled, longitudinally flexible, outer jacket 12, permits the inner wall to contract thereby reducing the force imposed upon the joining means by such contraction. Consequently, such means may be constructed of relatively thin material. Prior art transfer conduits, on the other hand, often require the joining means to support a substantial amount of the contraction forces in order that the difference in length, due to the contraction of the inner conduit and the outer jacket will remain small. Inner conduit 10 of the present invention is preferably constructed of Invar because of its relatively small coefficient of contraction and expansion at cryogenic fluid temperatures. This material is an iron-nickel alloy. Other materials such as stainless steel are also suitable. The wall-thickness of inner conduit 10 is determined by the difference between the fluid pressure therein and the surrounding vacuum pressure. Generally, a thickness of between about 0.008 inch and 0.500 inch is sufficient.

When two or more transfer conduit sections, such as A and B, are connected an outer jacket coupling means closure is employed preferably in the form of a cylindrical member which may be gas tightly sealed to the jacket sections. The sealing means could be by welding, brazing or the like, however, the embodiment of coupling means C, shown in FIG. 1, is preferably employed. Such coupling means comprises a closure sleeve 30, positioning and packing follower rings 31, rubber or other composition gaskets 32, and drawbolts 34 (one of which is shown). This type coupler is commercially available and is manufactured and distributed by the Dresser Industries of Bradford, Pa. The present invention contemplates that annular insulation space 20 formed between inner conduit 10 and sleeve 30 and enclosed by joining means 16 and 18, be substantially filled with opacified insulating material and provided with adsorbent material shown generally at 36 and similar to the molecular sieve material employed in evacuable insulation space 14.

To assemble this joint, the two sections of the transfer conduit having the zigzag joining means 16 and 18 are brought together and preferably welded at 15 at the ends of the Invar inner conduit 10. In joining the two Invar walls, it would be preferable, from the standpoint of ease in fabrication, that stainless steel rings 38 and 40 be welded to the ends of the inner conduit wall at the factory. Field welding stainless steel is believed to be easier than field welding Invar. The molecular sieve absorbent and the opacified insulation are then properly positioned. Sleeve 30 is then positioned followed by rubber gaskets 32 and positioning rings 31. The whole assembly is then tightened together by drawbolts 34. It should be noted that there will be relatively little load imposed on the thin zigzag joining means. As the drawbolts are tightened, rubber gaskets 32 will effect a vacuum tight seal against the outer face of the outer jacket 12 of the transfer conduit by being squeezed together between sleeve 30 and positioning rings 31. Since there will be no leakage of atmospheric air into insulation space 20, the molecular sieve can be used to create the vacuum. Prior to its use, it is preferred that the sieve and the insulation are sealed in a package so that the sieve will not become moisture laden. After placing them in the joint, the seals of the package are removed and the coupling brought together and tightened in the manner previously described. Thus the adsorbent will be, for all practical purposes, moisture free and, hence, will be capable of creating a vacuum. When the cold cryogenic fluid passes through the line the sieve will be cooled down to the point where it can effectively adsorb the gases left in the joint area during its formation. Using this method a vacuum having a pressure less than about 5 microns of mercury can be created. This method eliminates the need of having a vacuum pumping system at the place where the transfer conduit is being installed. It should be emphasized that the adsorbent must be kept sealed from the atmosphere prior to use and further it should be emphasized that the coupling should be assembled as soon as possible once the seal of the adsorbent has been broken in order to prevent the adsorbent from becoming laden with moisture. Alternatively, the vacuum could be created by the use of a pump to pull the gas through a "pinch-off" tube or a vacuum valve (not shown). The molecular sieve would then effectively maintain the vacuum.

It should be noted that if the transfer conduit is being used as a fuel line to transfer fuel through a colder cryogenic medium, the molecular sieve adsorbent should preferably be positioned against outer wall 12 of the transfer conduit. Likewise, the adsorbent at 36 should preferably be positioned against sleeve 30.

Although not shown in the drawing, the cover of coupling means C, that is, sleeve 30 of FIG. 1, contains a bursting or rupture disc, which for safety purposes, provides for the release of excessive pressures that could be built up within the joint through accidentally created leaks. For example, the weld joining the two inner walls of inner conduit 10 could become defective thereby allowing cryogenic gases to expand into the joint or the coupling itself could become defective thereby allowing atmospheric air to become adsorbed by the molecular sieve until it becomes saturated. Then when the transfer line is not in use, the adsorbent will warm and release the gases adsorbed by it to create the excessive pressures. An example of such a disc would be a thin metallic sheet that is capable of breaking when a predetermined pressure is exerted against it.

The transfer conduit may be provided with short sections or fittings F such as elbows, T's, and reducers between two transfer conduit sections A and B as shown, for example, in FIG. 7. Such an exemplary elbowfitting F comprises an inner conduit section 110, an outer jacket section 112 which substantially concentrically encloses inner conduit section 110 thereby forming an insulation space section 114. The latter is preferably substantially filled with opacified insulating material preferably of the wrapped-type. The ends of the fitting are preferably connected to transfer conduit sections A and B in the manner described with reference to coupling means C of FIG. 1. The adsorbent material shown generally at 136a and 136b will evacuate the entire coupling means and insulation spaces 120a, 114 and 120b in the manner described with reference to FIG. 1. Consequently, the ends of the fitting need not be sealed nor must insulation space 114 be pre-evacuated prior to connection with transfer conduit sections A and B. A vacuum connection may be provided if desired.

Figure 3:
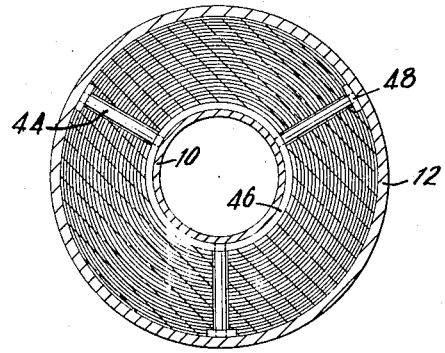
FIG. 3 is a cross sectional view illustrating another feature of the present invention.

To provide support for thin-walled outer jacket 12 it is preferred that spacers 44, such as those depicted in FIG. 3, be employed to maintain the concentricity between inner conduit 10 and outer jacket 12. The preferred embodiment of these spacers takes the form of three radially equi-spaced hollow pegs which are constructed of a phenolic thermosetting resin reinforced with paper or fabric. As shown in FIG. 3, the spacers 44 are preferably connected to the outer surface of inner conduit 10 by stainless steel rings 46 which are preferably welded or soldered to the outer surface of inner conduit 10. The other end of each spacer is fitted into a recessed portion or cap 48. Preferably, cap 48 is constructed of brass, but may be constructed from a thermosetting plastic resin or the like. Where wrapped-type opacified insulation is employed within evacuable insulation space 14, it is preferred that holes be provided in such insulation for the spacers. The holes should be made sufficiently large so that there will be no contact between rings 46 and the insulation which would reduce the effectiveness of the insulation through heat leak by conduction. The number of spacers and their size required depends upon the particular load requirements of the transfer conduit. As an example, it has been found that in a transfer conduit having a 5 inch outer diameter and a 3½ inch inner diameter, 3 radially equispaced hollow plastic pegs ⅜ inch in diameter with a wall thickness of ¹⁄₆₄ inch placed at 12 foot intervals along the transfer conduit length are suitable.

Figure 2:
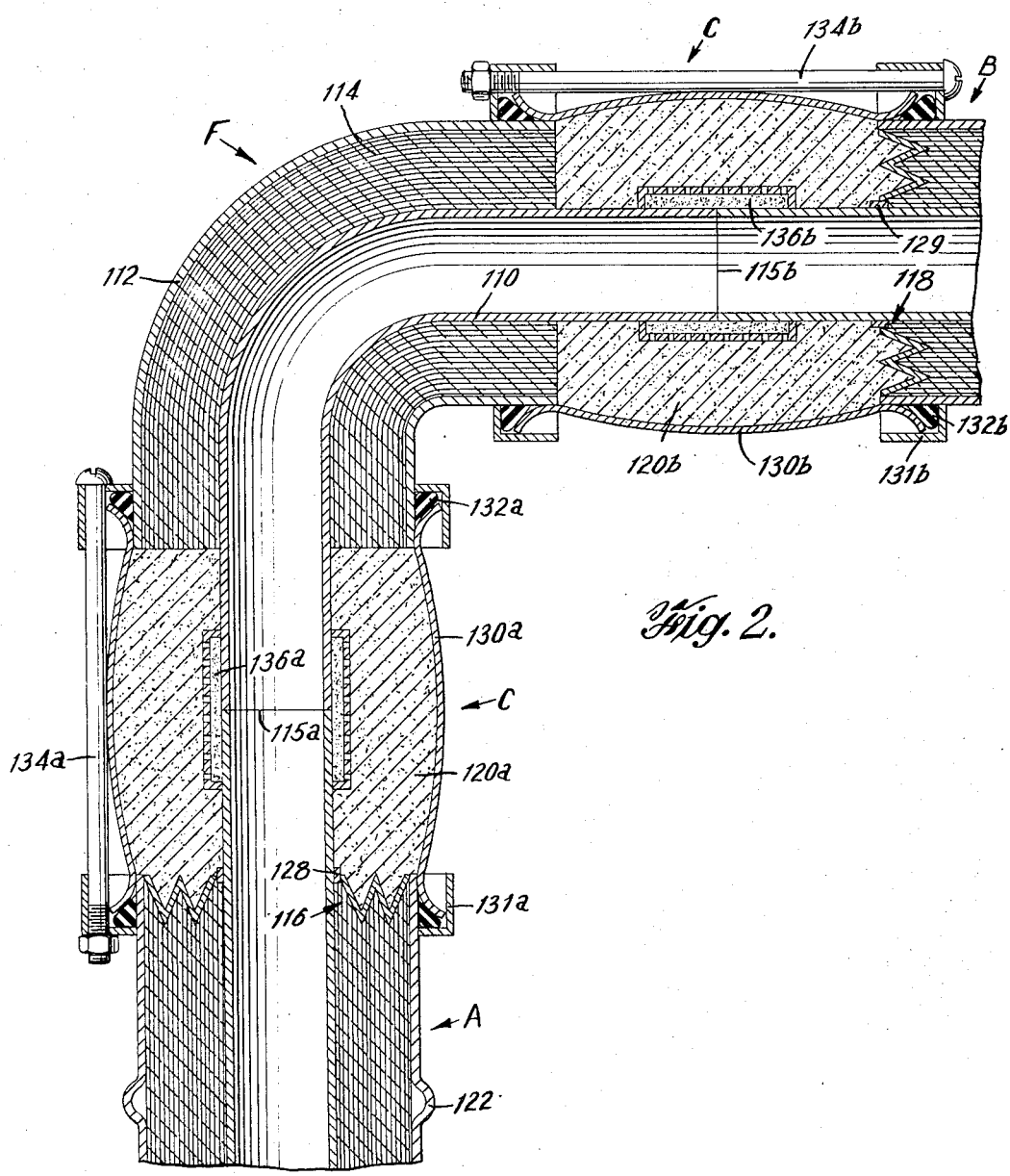
FIG. 2 is a similar view showing a fitting in the joint.

It will be understood that modifications and variations may be effected without departing from the scope of the novel concepts of the present invention. For example, the cover of coupling means C of FIGS. 1 and 2, while particularly useful when joining transfer conduit sections in the field, may not be necessary where the transfer conduit is prefabricated. In such case, the coupling means cover arrangement, with the gaskets and the drawbolts, could be replaced by a stainless steel cylinder wrapped around the joint and with its ends directly, or through flange rings, welded to the outer jacket sections.

What is claimed is:

1. A vacuum-insulated double-walled fluid transfer conduit, comprising an inner conduit for such fluid; a larger outer jacket concentrically spaced around said inner conduit so as to form an evacuable annular insulation space therebetween, the continuity of the inner and outer surfaces of the outer jacket being disrupted to form a plurality of annular anticlinal-like protrusions which provide longitudinal flexibility spaced apart by nondisrupted portions of such surfaces which provide lateral stiffness, such protrusions constituting a minor portion of such surfaces relative to the nondisrupted portions; insulating material substantially filling the insulating space; means for gas tightly joining the ends of said outer jacket to said inner conduit, at least one such joining means comprising intersecting oppositely oriented frusto-conical annular surfaces formed of separate frusto-conical annular rings gas-tightly joined together in base-to-apex end fashion, such joining means in combination with said outer jacket and said inner conduit being constructed to maintain a pressure below about 30 microns of mercury within said insulation space.

2. A vacuum-insulated, double-walled, liquefied gas transfer conduit having at least one joint therein and comprising at least respective first and second sections of an inner conduit for such liquid and first and second sections of a larger outer jacket concentrically spaced around the inner conduit sections so as to form at least first and second evacuable annular insulation spaces therebetween, the continuity of the inner and outer surfaces of the outer jacket being disrupted to form a plurality of annular anticlinal-like protrusions which provide longitudinal flexibility spaced apart by nondisrupted portions of such surfaces which provide lateral stiffness, such protrusions constituting a minor portion of such surfaces relative to the nondisrupted portions; a coupling means for vacuumtightly connecting the first and second sections of said outer jacket and enclosing the joint when the first and second sections of said inner conduit are leak-tightly connected, and thereby forming a third evacuable annular insulation space; first joining means for connecting the joint end of the first section of said outer jacket to the first section of said inner conduit, and second joining means for connecting the joint end of the second section of said outer jacket to the second section of said inner conduit, such first and second joining means comprising intersecting oppositely oriented frusto-conical annular surfaces formed of separate frusto-conical annular rings gas-tightly joined together in base-to-apex end fashion; said first and second joining means and said coupling means being so constructed to maintain a pressure below about 30 microns of mercury within the third insulation space; and insulating means substantially filling the insulation spaces.

References Cited
UNITED STATES PATENTS

| | | | |
|---|---|---|---|
| 1,140,633 | 5/1915 | Trucano | 285—147 |
| 1,565,254 | 12/1925 | Bystrom | 138—148 |
| 1,871,508 | 8/1932 | Gardner | 138—149 |
| 2,269,695 | 1/1942 | Scharf | 285—53 |
| 2,314,328 | 3/1943 | Enderle | 138—145 |
| 2,419,278 | 4/1947 | Motsenbocker | 138—149 |
| 2,451,146 | 10/1948 | Baker | 138—149 |
| 2,613,166 | 10/1952 | Gronemeyer | 138—147 |
| 2,761,949 | 9/1956 | Colton | 285—47 |
| 2,894,538 | 7/1959 | Wilson | 285—53 |
| 2,901,274 | 8/1959 | Smith | 285—369 |
| 2,930,407 | 3/1960 | Conley | 138—148 |
| 2,962,051 | 11/1960 | Burkes | 138—149 |
| 2,964,064 | 12/1960 | Jones | 285—47 |
| 3,068,026 | 12/1962 | McKamey | 285—47 |

FOREIGN PATENTS

| | | |
|---|---|---|
| 211,397 | 2/1959 | Australia. |

OTHER REFERENCES

Rex-Flex, pp. 2–4, Chicago Metal Hose Corporation, Maywood, Ill.

CARL W. TOMLIN, *Primary Examiner.*

EDWARD C. ALLEN, THOMAS F. CALLAGHAN,
*Examiners.*

J. B. SCHWOYER, *Assistant Examiner.*